United States Patent [19]
van Deventer

[11] Patent Number: 5,293,264
[45] Date of Patent: Mar. 8, 1994

[54] TRANSMISSION SYSTEM FOR THE POLARIZATION-INSENSITIVE TRANSMISSION OF SIGNALS

[75] Inventor: Mattijs O. van Deventer, Leidschendam, Netherlands

[73] Assignee: Koninklijke PTT Nederland N.V., Groningen, Netherlands

[21] Appl. No.: 803,188

[22] Filed: Dec. 5, 1991

[30] Foreign Application Priority Data

Dec. 10, 1990 [NL] Netherlands .................. 9002713

[51] Int. Cl.$^5$ ............................................. H04B 10/06
[52] U.S. Cl. ...................................................... 359/192
[58] Field of Search ............... 359/156, 173, 192, 190, 359/191

[56] References Cited

U.S. PATENT DOCUMENTS

| | | | |
|---|---|---|---|
| 4,850,048 | 7/1989 | Mohr | 359/192 |
| 4,856,093 | 8/1989 | Mohr | 359/192 |
| 4,979,235 | 12/1990 | Rumbaugh | 359/192 |
| 5,052,051 | 9/1991 | Naito | 359/192 |
| 5,124,828 | 6/1992 | Mahon | 359/192 |
| 5,170,275 | 12/1992 | Large | 359/192 |

FOREIGN PATENT DOCUMENTS

| | | | |
|---|---|---|---|
| 0271934 | 6/1988 | European Pat. Off. | 359/192 |
| 0361151A2 | 4/1990 | European Pat. Off. | |
| 0010937 | 1/1987 | Japan | 359/192 |
| 0049338 | 3/1987 | Japan | 359/192 |
| 0229926 | 9/1988 | Japan | 359/192 |

OTHER PUBLICATIONS

Okoshi, "Polarization State Control Schemes for Heterodyne or Homodyne Optical Fibre Communications", Journal of Lightwave Tech. vol. LT3, No. 6, pp. 1232-1237, Dec. 1985.
Journal of Lightwave Technology, vol. 6, No. 10, Oct. 1988, (New York, US) I.M.I. Habbab et al, "Polarization-Switching Techniques for Coherent Optical Communications", pp. 1537-1548.
Journal of Lightwave Technology, vol. 8, No. 8, Aug. 1990, (New York, US), M. V. Andres et al, "Optical-Fiber Resonant Rings Based on Polarization-Dependent Couplers", pp. 1212-1220.
IEEE Global Telecommunications Conference & Exhibition, Dallas, Tex. Nov. 27-30, 1989, IEEE, (New York, US), G. DeMarchis et al, "Phase-Noise and Polarization State Insensitive Coherent Optical Receivers", pp. 365-370.
Electronics Letters, vol. 25, No. 4, Feb. 16, 1989, (Stevange, Herts, GB), A. D. Kersey et al, "Adaptive Polarisation Diversity Receiver Configuration for Coherent Optical Fibre Communications", pp. 275-277.

*Primary Examiner*—Leslie Pascal
*Attorney, Agent, or Firm*—Frishauf, Holtz, Goodman & Woodward

[57] ABSTRACT

The invention relates to a transmission system for the polarization insensitive transmission of signals over a signal path between a transmitter and a receiver, provided with high-order retarder. The retarder is a combination of a polarization-splitting coupling and a loop-type delaying transmission route. The retarder may be sited at the receiver end, with a suitably chosen angle between one of the principal axes of the retarder and the polarization of a local oscillator incorporated in the receiver. Advantages are reduction in size and number of components in the retarder, reduction in the number of retarders in such a transmission system and an increase of the capacity for integration.

3 Claims, 2 Drawing Sheets

TRANSMISSION SYSTEM FOR THE POLARIZATION-INSENSITIVE TRANSMISSION OF SIGNALS

The invention relates to a transmission system for the polarization insensitive transmission of signals over a signal path between a transmitter and a receiver, provided with a high-order retarder which comprises a polarization-splitting device having at least one input and two outputs for splitting the transmission between a first transmission route and a second transmission route and a recombination device connected to the transmission routes and having two inputs and an output for recombining the transmitted signals.

BACKGROUND AND PRIOR ART

Such a transmission system is disclosed by the paper entitled "Polarization-Switching Techniques for Coherent Optical Communications" which appeared in Journal of Lightwave Technology, Vol.6, No.10, October 1988, pages 1537 to 1548.

It is generally known that, at the end of an optical waveguide or optical fiber, the polarization state of the light transmitted over the optical waveguide fluctuates. Various causes for this phenomenon can be identified, such as a mechanically twisted optical fiber, temperature variation, bends in the optical fibers and the like. The varying mismatching between the polarization of the received signal and the polarization of the signal from the local oscillator adversely affects the sensitivity of the receiver. In the paper mentioned above, a number of solutions are mentioned for obtaining a transmission over an optical fiber which is as insensitive as possible to the varying polarization. One of the solutions is the polarization-switching method, in which a high-order retarder making use of a birefringent medium is used.

A medium having a large birefringence effect can be simulated in a laboratory by means of optical devices. In these, light is applied to a polarization-splitting device, as a result of which the light is split into components having horizontal and vertical polarization, respectively. Said components traverse different distances and are then combined in a coupling device. One problem in this connection is that two polarization-splitting devices are necessary which, in a bulk or optical fiber construction lead to a high price, while, in an integrated optical construction, the total length of the high-order retarder can be a problem. An alternative method of construction is to use a birefringent fiber, as described in the abovementioned article. Such a fiber having birefringence has, however, the disadvantage that it is expensive while, in addition, a large length is necessary.

The paper by M. V. Andres et al. entitled "Optical-fiber resonant rings based on polarization-dependent couplers", published in Journal of Lightwave Technology, Vol. 8, No. 8, August 1990, pages 1212–1220 discloses sensor configurations based on an optical fiber resonant circuit in which, in a particular case, a polarization-splitting coupling is used in combination with a loop of polarization-maintaining fiber.

SUMMARY OF THE INVENTION

The object of the invention is to provide a transmission system of the type mentioned at the outset in which the abovementioned problems are dealt with.

This object is achieved, according to the invention, in that the polarization-splitting device, the first transmission route and the recombination device are formed by one polarization-splitting coupling device having a second input, of which the first input and the first output are the input and the output, respectively, of the high-order retarder, the delaying transmission route being incorporated between the second input and the second output of the polarization-splitting coupling device.

The advantage of this construction in bulk or optical fiber is the saving of a polarization-splitting device. In this construction, only one polarization-splitting device is necessary, compared with two devices in a conventional construction. This embodiment is, in addition, excellently capable of integration because only one polarization-splitting coupling device is necessary and the length of the high-order retarder is short as a result of routing back the delaying transmission route. In addition, this transmission route or line can be very short if integrated optically.

The invention also relates to a transmission system for the polarization insensitive transmission of signals over a signal path between a transmitter and a receiver, provided with a high-order retarder, in which the receiver comprises a local oscillator and a coupling device for coupling it to the signal path and may be shared by at least two transmitters in a passive optical network.

From the abovementioned paper it is known to provide a high-order retarder (preferably a birefringent optical fiber) at the transmission end of a coherent communication system in order to render the latter insensitive to polarization by means of the principal of "data-induced polarization switching". If a receiver is shared by a number of transmitters, it will be advantageous to use the method mentioned at the receiving end. This method only works if the polarization of the signal applied to the high-order is at a fixed angle of virtually 45° with respect to the principal axis of the high-order retarder.

In practice, however, the signal presented to the receiver has, in particular, a strongly fluctuating polarization, and this will present problems in using the high-order retarder at the receiving end.

Surprisingly, it has been found that the problems are avoided in that the high-order retarder is connected between the signal path and the coupling device and the angle between one of the principal axes of the retarder and the polarization of the local oscillator is greater than 0° and less than, or equal to, 180° according to Poincaré's representation. Preferably, said angle is 90° according to Poincaré's representation.

To summarise, application of the invention offers the advantage of a reduction in the size and number of components in a high-order retarder, of a reduction in the number of such retarders in a transmission system for the polarization-insensitive transmission of signals, and an increase in the capacity for integration.

BRIEF DESCRIPTION OF THE DRAWINGS

The invention will be explained in greater detail below with reference to the drawings. In the drawings.

DESCRIPTION OF THE ILLUSTRATED EMBODIMENTS

Polarized light can always be broken down into, or built up from, two orthogonally polarized components, with or without a phase difference. Light linearly polarized at 45° can, for example, be formed from a component having horizontal polarization and a component having vertical polarization, which components are precisely in phase. In the case of circularly polarized light, the components having horizontal and vertical polarization, respectively, of the electric field are 90° out of phase.

The high-order retarder according to the invention is based on the concept of retardation. This concept implies that one component is delayed with respect to the other. The retardation can be expressed in degrees. A retardation of 90° converts light linearly polarized at 45° into circularly polarized light. Retardation can also be expressed as a fraction of the wavelength. A retardation of 90° is equivalent to a quarter wavelength. A 90° retarder is therefore also referred to as a $\lambda/4$ retarder. As a third possibility, the retardation can also be defined as delay time. 1500 nm light has a cycle time of 5 fs ($5.10^{-15}$ sec). A retardation of 90° is then equivalent to $1/4.5$ fs $= 1.25$ fs.

The high-order retarder is to be regarded as a retarder having a very large retardation. For example, a retardation of 15 cm (500 ps, $100,000\lambda$, $36,000,000°$). The order of a retarder is the number of times that 360° has to be subtracted from the retardation to arrive at an amount between $-180°$ and $+180°$. A retarder with a retardation of 15 cm therefore has an order of 100,000. It is known to use a birefringent fiber of great length as a retarder. A typical value of the birefringence power of this fiber is $5.10^{-4}$, i.e. 0.5 mm retardation for 1 m of fiber. A retardation of 15 cm therefore requires a birefringent fiber 300 m long, as a result of which the size of the high-order retarder is large. In addition, birefringent fibers are expensive.

Figure 1:
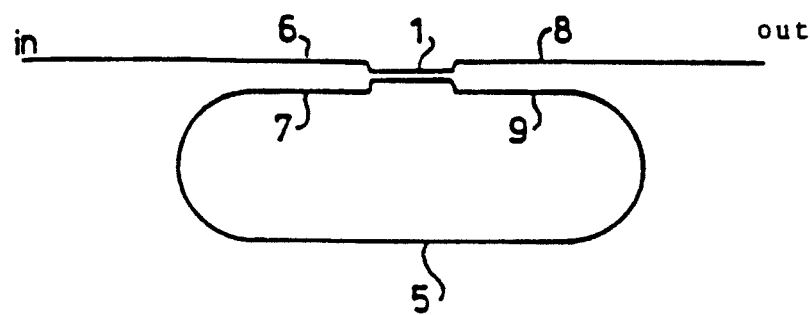
FIG. 1 shows an embodiment of the high-order retarder according to the invention.

FIG. 1 shows an embodiment of the high-order retarder according to the invention in which a large retardation is achieved.

In this high-order retarder, only one polarization-splitting coupling device 1 having two inputs 6 and 7 and two outputs 8 and 9 is used. The input light signal applied to the input of the high-order retarder is applied to the input 6 of the polarization-splitting coupling device 1, which splits the input light signal into a component having a first polarization and a second component having a second polarization, which components are presented to the respective outputs 8 and 9 of the polarization-splitting coupling device 1. For example, the component having horizontal polarization direction appears at the output 8 of the polarization-splitting coupling device 1 and therefore also at the output of the high-order retarder. A first transmission route therefore runs from "in" to via 6, 1 and 8 to "out". The component having vertical polarization appears, however at the output 9 of the polarization-splitting coupling device 1 and is applied, via a second transmission route, in this case formed by the delaying optical waveguide 5, to the second input 7 of the polarization-splitting coupling device 1. The recombination of the two transmission routes takes place in the coupling device 1 itself, because the delayed component also appears at the output 8 of the polarization-splitting coupling device 1 and is therefore combined with the component having horizontal polarization direction, which combination is presented to the output of the high-order retarder. The component having horizontal polarization direction therefore travels, as it were, straight through and the component having vertical polarization always crisscrosses in the polarization-splitting coupling device 1. As a result of using this property of the polarization-splitting coupling device 1, one coupling device is therefore sufficient.

Said high-order retarder has the property that the application thereto of an input signal having a predetermined frequency produces an output signal having a particular polarization direction. If the frequency of the input signal is, for example, 1 GHz higher, a signal is produced at the output of the retarder with a polarization whose direction is perpendicular to that of the first-mentioned output signal. Switching between the input frequencies therefore produces a switching between the two polarization directions mentioned. The retarder then acts as a polarization switch.

The advantage of the abovedescribed embodiments of the invention is that they can easily be implemented in a compact and optically integrated form. In optically integrated form, in particular, the length of the component (retarder) is of importance. This embodiment, in particular, is therefore very attractive. In this embodiment, only one polarization-splitting coupling device is used, the routing-back of the delaying optical waveguide contributing to a shorter length of the polarization switch.

It is pointed out that, in optically integrated form, the delaying waveguide is shorter because a very high refractive index can be used and, with a refractive index of, for example, 3, the delaying waveguide or line has a length of only 5 cm. In addition, a rolled-up delaying line can be used.

The advantage of this construction in bulk or optical fiber is the saving of a polarization-splitting device. In this construction, only one polarization-splitting device is necessary, compared with two devices, i.e. a splitter and recombination device in a conventional construction.

Two applications of the polarization switch or retarder according to the invention are described below.

Figure 2:
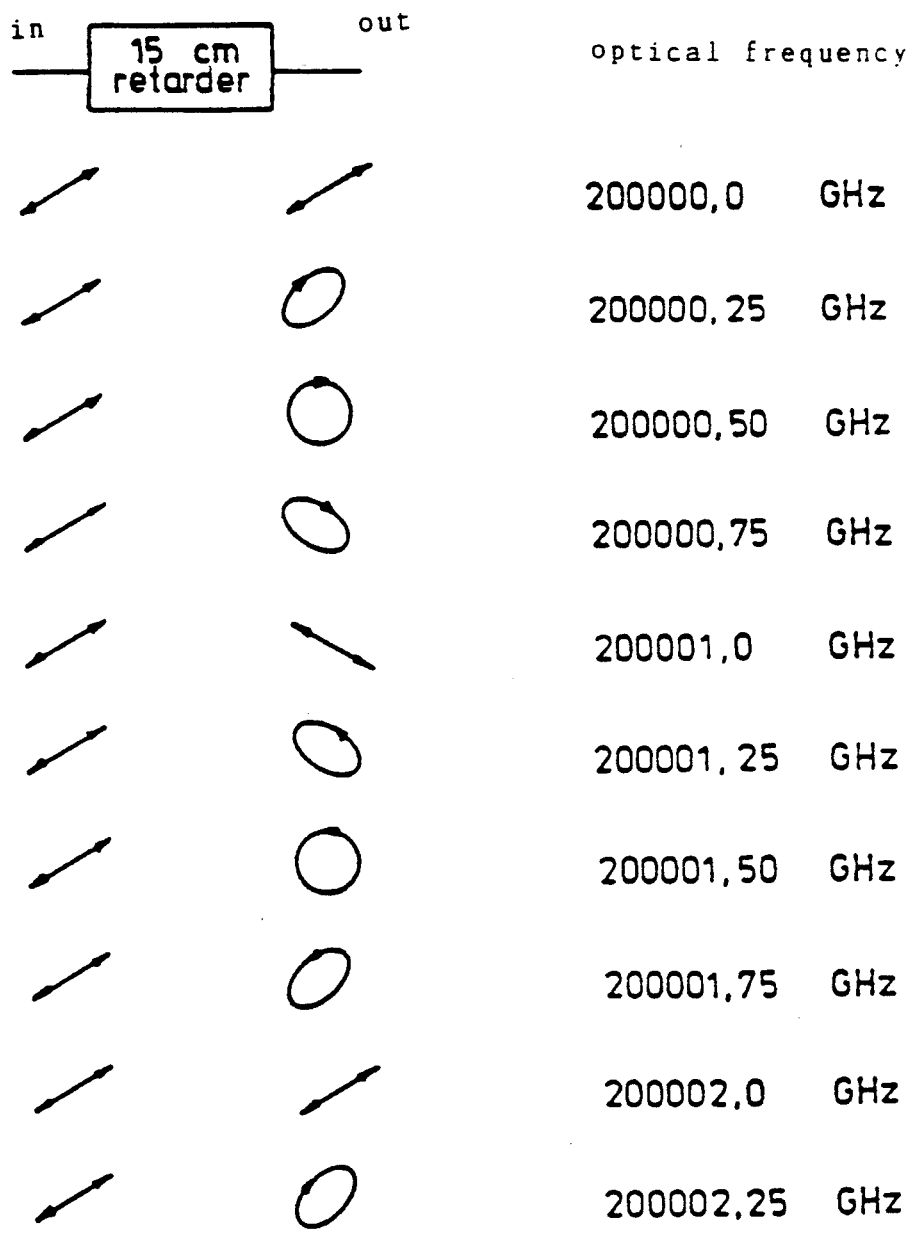
FIG. 2 shows a diagram of the polarization at the output of a retarder as a function of the frequency of the input signal.

The most important application of a retarder having high retardation is the conversion of optical frequency modulation into polarization modulation, also referred to as "data-induced polarization switching". For an optical frequency of 200,000 GHz ($\lambda \approx 1500$ nm), the 15 cm retarder according to the invention behaves as a $36,000,000°$ retarder. Modulo 360°, that is a 0° retarder. For a somewhat higher frequency, the wavelength is somewhat smaller and somewhat more wavelengths therefore fit into the 15 cm, with the result that the retardation is rather greater. For an optical frequency of 200,000.5 GHz, the retardation becomes $36000090°$ (in this case, then it is a retardation of 90° modulo 360°). For 200,001 GHz, the retardation becomes $36000180°$, etc. This behaviour is shown in FIG. 2 for a number of frequencies. Because the frequency is swept over the correct interval, in this example over 1 GHz, the polarization will be switched between two orthogonal positions. This is attractive for communication systems which are sensitive to polarization fluctuations (coherent systems). If all the "zeros" are lost as a result of an accidental polarization adjustment, all the "ones" can still be received and vice versa. The signal can never be completely lost.

A second application of retarders having high retardation is "polarization scrambling"/depolarization of light. For this purpose, a light source is taken which has a coherence length which is much shorter than the retardation. In this example, a light source having a spectral width of many GHz is used. The effect of this is that all the polarizations occur simultaneously at the output of the high-order retarder during 1 bit, and, that the light is therefore in fact emitted in unpolarized form.

According to the abovedescribed principal of "data-induced polarization switching", the signal from the transmitter is coupled in a high-order retarder in such a way that the polarization of the coupled-in signal is at 45° to the principal of the high-order retarder. The transmitter is FSK-modulated between two optical frequencies. The high-order retarder has the property that the output polarization is a function of the optical frequency of the signal applied thereto, with the result that the polarization is modulated along with the optical frequencies as a result of using the FSK modulation.

Mention has just been made above of "the" principal axis of a high-order retarder. In fact, a high-order retarder has, however, two principal axes, namely the fast and the slow principal axis which are mutually perpendicular. It is therefore preferable to speak of one of the principal axes, or of both of them when the angle to them is 45°.

For the correction operation of the principal of "data-induced polarization switching", the output polarizations for a "zero" state should the orthogonal with respect to a "one" state. For this purpose, inter alia, the polarization of the signal from the transmitter should be polarized at 45° with respect to the principal axis of the high-order retarder. It is only in that case that the output polarization associated with the "zero" and "one" states can be orthogonal, which is, after all, required.

During the transmission of a light signal through an optical fiber, the polarization changes randomly, but the orthogonality between the "zero" and "one" states is maintained.

A coherent receiver is sensitive to only one component of the polarization, with the result that the signal may be lost as a result of the change in the polarization in the fiber. Because of the orthogonality mentioned between the polarizations of the "zero" and "one" states, for example, all the "zeros" may be lost, but, on the contrary, all the "ones" will be optimally detected. The converse and all the intermediate forms are also possible. In no case will the entire signal be lost.

The principal of "data-induced polarization switching" at the transmitting end is possible because the transmitter has a known fixed polarization which can be coupled into the high-order retarder at the correct angle.

The costs of the principal mentioned consist, in particular, of the price of the high-order retarder and the installation thereof. In addition, the space the retarder occupies is of great importance. If a receiver has to be shared by many transmitters, for example for the data traffic from the subscribers to a final exchange, as is contemplated for the practice of the present invention it will be advantageous to apply the principal of "data-induced polarization switching" to the receiver because the cost associated with the high-order retarder have to be incurred only once.

The desired application at first sight appears impossible. For the principal mentioned of "data-induced polarization switching" it is, after all, required that the polarization of the signal applied to the high-order retarder is precisely at 45° to the principal axes of the high-order retarder. It is only then that the output polarizations associated with the "zero" and "one" states can be orthogonal.

As has been mentioned above, the polarization of a light signal varies randomly during its transport through an optical fiber. At the receiving end, it is not possible therefore to satisfy the requirement that the polarization is always at 45° with respect to the principal axes of the high-order retarder. It may even occur that the polarization becomes precisely parallel to a principal axis of the retarder, as a result of which the polarization is simply maintained in the high-order retarder and the "zero" and "one" states emerge from the high-order retarder with the same polarization. There is then no longer any question of "data-induced polarization switching".

It therefore heretofore appeared that the application of the "data-induced polarization switching" principal at the receiver was not possible because after the signal has been transmitted through the optical fiber, the polarization has been randomly altered and, in addition, varies with time, as a result of which it is impossible to couple the light into the high-order retarder at the correct angle.

Figure 3:
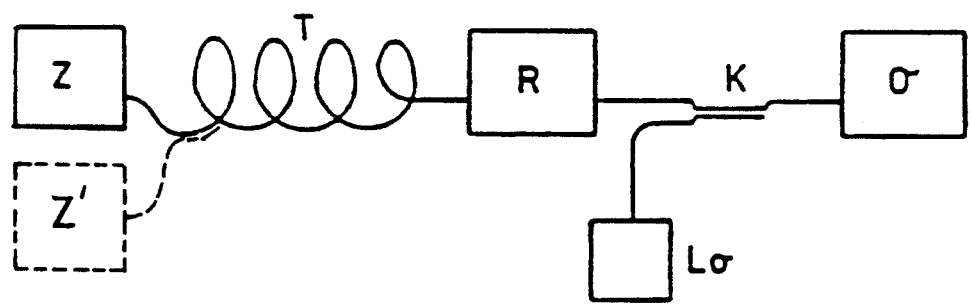
FIG. 3 shows another embodiment according to the invention.

In spite of this, the solution according to the invention shown in FIG. 3 has been found.

The light signal originating from the transmitter Z is applied via a transmission path T and a high-order retarder R to one input of a coupling device K. Coupled to the output of said coupling device K is the receiver O. The signal from the local oscillator LO is applied to the other input of the coupling device K.

As mentioned above, the receiver R may be shared by at least two transmitters in a passive optical network. This option is illustrated in broken lines in FIG. 3 for the additional transmitter Z'.

The arrangement shown in FIG. 3 is possible because a particular requirement is met. This requirement is that the polarization of the light from the local oscillator LO is at 45° with respect to the principal axes the high-order retarder R.

If it is assumed that the polarization of the received signal is accidentally at 45° with respect to the principal axes of the retarder R, the method of "data-induced polarization switching" operates in the same way as if the retarder were provided at the transmitting end. The polarizations of the zeros and ones at the output of the retarder are in this case mutually orthogonal and if the "zeros" are lost, the "ones" will always be left over and vice versa, while all the possible intermediate forms do not present problems either.

If the other extreme case occurs, in which the received polarization runs precisely parallel to a principal axis of the high-order retarder, the polarizations of "zeros" and "ones" at the output of the high-order retarder have remained the same and they are still parallel to the principal axis. Because, however, the polarization of the output signal of the local oscillator forms an angle of 45° with the principal axes of the high-order retarder, the coherent receiver will nevertheless receive all the "zeros" and "ones", albeit at half power. In terms of sensitivity, this is equivalent to losing all the "zeros" and completely receiving all the "ones", with the result that the sensitivity is even in this case equal to the case where the high-order retarder is sited at the transmitter and the method of "data-induced polarization switching" is used.

In a corresponding manner, for polarizations at the input of the high-order retarder which are between the abovementioned extremes, that is to say 45° with respect to or parallel to the principal axes, the signal will never be lost.

To summarise briefly, the "data-induced polarization switching" principal is possible at the receiving end, provided the polarization of the local oscillator is at 45° with respect to the principal axes of the high-order retarder.

For the sake of the clarity the explanation, it has been assumed above that the polarization of the local oscillator or of the transmitter, respectively, is at an angle of 45° with respect to the principal axes of the high-order retarder. It is clear that the invention can be described much more generally by making use of Poincaré's representation or Poincaré's sphere. According to that representation, the polarization of the signal from the local oscillator must not coincide with a principal axis of the high-order retarder, it being preferable that the principal axis of said retarder forms, according to Poincaré's representation, an angle of 90° with the polarization of the output signal of the local oscillator. A special case of this is a local oscillator having a linearly polarized output signal which is at 45° to the principal axes of the high-order retarder. It is evident from the above statements that in the Poincaré representation an actual 45° angle between polarization planes or axes becomes a 90° angle in the Poincaré representation.

I claim:

1. Transmission system for the polarization-insensitive transmission of a frequency-modulated binary digital signal having binary states respectively represented by two optical frequencies, the system comprising:
   a transmitter of said frequency-modulated binary digital signal,
   a transmission path for transmitting said signal,
   a receiver for receiving said signal transmitted via said transmission path, said receiver including a local oscillator for generating a local oscillator signal and a coupling device for coupling said frequency-modulated binary digital signal, when received, with said local oscillator signal, and
   a high-order retarder, having two principal axes, for converting at least a part of said frequency-modulated binary digital signal into a frequency- and polarization-modulated signal having polarization switching between two different polarization states which correspond to said two optical frequencies, characterized in that
   said high-order retarder is connected between said transmission path and said coupling device, and in that
   said local oscillator signal has a polarization which is at an angle to one of the principal axes of said high-order retarder which is greater than 0° and less than 180° according to Poincaré's, representation.

2. Transmission system according to claim 1, characterized in that said angle between one of the principal axes of said high-order retarder and the polarization of the local oscillator signal is equal to 90° according to Poincaré's representation.

3. Transmission system according to claim 1 or 2, characterized in that the receiver is shared by at least two transmitters of binary frequency-modulated signals in a passive optical network.

* * * * *

UNITED STATES PATENT AND TRADEMARK OFFICE
CERTIFICATE OF CORRECTION

PATENT NO. : 5,293,264
DATED : March 8, 1994
INVENTOR(S) : Mattijs O. VAN DEVENTER It is certified that error appears in the above-identified patent and that said Letters Patent is hereby corrected as shown below:

Column 3, line 26, "1/4.5" should be --1/4·5--

Column 5, line 14, after "principal" insert --axis--

Column 6, line 43, after "axes" insert --of--

Signed and Sealed this

Twentieth Day of December, 1994

Attest:

BRUCE LEHMAN

Attesting Officer    Commissioner of Patents and Trademarks